Shoichi Miyashiro
BY Shunzi Shirouzu
INVENTORS
George B. Oujevolk
Attorney

TELEVISION IMAGE PICKUP TUBE DEVICE

Filed June 15, 1967 Sheet 2 of 3

Shoichi Miyashiro
BY Shunzi Shirouzu
INVENTORS
George B. Oujevolk
Attorney

Shoichi Miyashiro
BY Shunji Shirouzu
INVENTORS
George B. Oujevolk
Attorney

United States Patent Office 3,437,867

Patented Apr. 8, 1969

3,437,867

TELEVISION IMAGE PICKUP TUBE DEVICE

Shoichi Miyashiro and Shunzi Shirouzu, Yokohama-shi, Japan, assignors to Tokyo Shibaura Electric Co., Ltd., Kawasaki-shi, Japan, a corporation of Japan Filed June 15, 1967, Ser. No. 646,234
Claims priority, application Japan, June 17, 1966, 41/38,882
Int. Cl. H01j *31/26, 29/76*
U.S. Cl. 315—10 6 Claims

ABSTRACT OF THE DISCLOSURE

A television image pickup tube device having an magnetic field generator close to the photoelectron cathode of the image section thereof, whereby it is possible to accelerate and focus photoelectrons on the target by the action of the magnetic field and electric field, to avoid the scattering of returned electron beam from said target and at the same time to prevent the bad influence due to said magnetic field from being given to a scanning section by regulating the leakage magnetic field of the target at its scanning side to be less than 25 gausses.

This invention is concerned with a television image pickup tube device.

Recently need has been particularly strongly felt for reducing the dimensions of television cameras and for lightening their weights.

Conventional image pickup tubes (image orthicon tubes, for example), however, are of the electromagnetic deflection focussing type which requires a coil assembly having large dimensions and a heavy weight, and a concommitantly large power supply circuitry, which has the disadvantage of requiring a large power consumption. For overcoming these shortcomings, an image orthicon tube of electrostatic deflection focussing type has been also conceived.

Namely this system of image orthicon tube uses an electrostatic lens in the image section for accelerating and focussing image photoelectron beam at the target, and utilizes an electrostatic electron lens to vertically incide the electron beam deflected in the scanning section into the storage target.

This system does not require a long, large coil, and thus has the advantage of being light in weight. However, the electrostatic lens in the image section generally is liable to cause a pin-cushion distortion and its level of resolution deteriorates greatly when the image is focussed in the center of the screen, particularly in the peripheral portions. This is due to the large bending of the focussing surface. And for preventing this drawback, the image section generally is designed to be extremely large and long. Thus the design of this system to prevent this drawback defeats the aim of miniaturization and the system has not been brought into practical application.

The present invention offers a television image pickup tube device which eliminates the shortcomings cited above.

One object of this invention is to provide a television image pickup tube device which is of an extremely small and/or light construction when compared with a conventional electromagnetic or electrostatic pickup tube.

Another object of this invention is to provide a television image pickup tube device wherein the pickup tube has no shading trouble, when compared with a conventional electromagnetic pickup tube.

A further object of this invention is to provide a television image pickup tube device wherein alignment adjustment of scanning beams is easily achieved.

Another object of this invention is to provide a television image pickup tube device wherein the focussing and picture distortion in the image section of the pickup tube are far better than those in the image section of an electrostatic type pickup tube, so that it is possible to obtain about the same degree of picture quality as that of the all electromagnetic type image orthicon.

Another object of this invention is to provide a television image pickup tube device wherein the magnification rate of the electron lens of the image section can be easily increased, and a small optical lens may be utilized.

A further object of this invention is to provide a television image pickup tube device wherein a magnetic field generator provides in the image section facilitates electron zooming.

A still further object of this invention is to provide a television image pickup tube device wherein an image section can be constructed much shorter than that of a conventional image pickup tube, so that it is particularly convenient for constructing a tube such as an image orthicon tube having a so-called intensifier, that is, an electron intensifying diode in the middle of the image section.

According to the invention there is provided a television image pickup device comprising an electron scanning section including a vacuum container, an electron gun mounted on one end of said vacuum container, means for focussing the electron beam from said electron gun, means for deflecting the focussed electron beam, cylindrical electrodes mounted coaxially with said electron gun, a field mesh electrode for supplying the highest electrical potential to said electron beam for making said electron beam parallel to the axis of the pickup tube, a collimation lens counted coaxially with said electrodes and formed by the electrostatic field of said field mesh electrode, and a target mounted in close parallel to said field mesh electrode and scanned at low speed by said electron beam, an image section including a photoelectron cathode mounted on the other end of said vacuum container, and which focusses the image electrons from said cathode on said target, and a magnetic field generator provided outside the pickup tube on said image section side to prevent a leakage of more than 25 gausses of magnetic field on on the axis of the pickup tube on the photoelectrons from said photoelectron cathode on said target.

Other objects and advantages the invention will become apparent from the following detailed description taken in conjunction with the accompanying drawings, in which.

Figure 1:
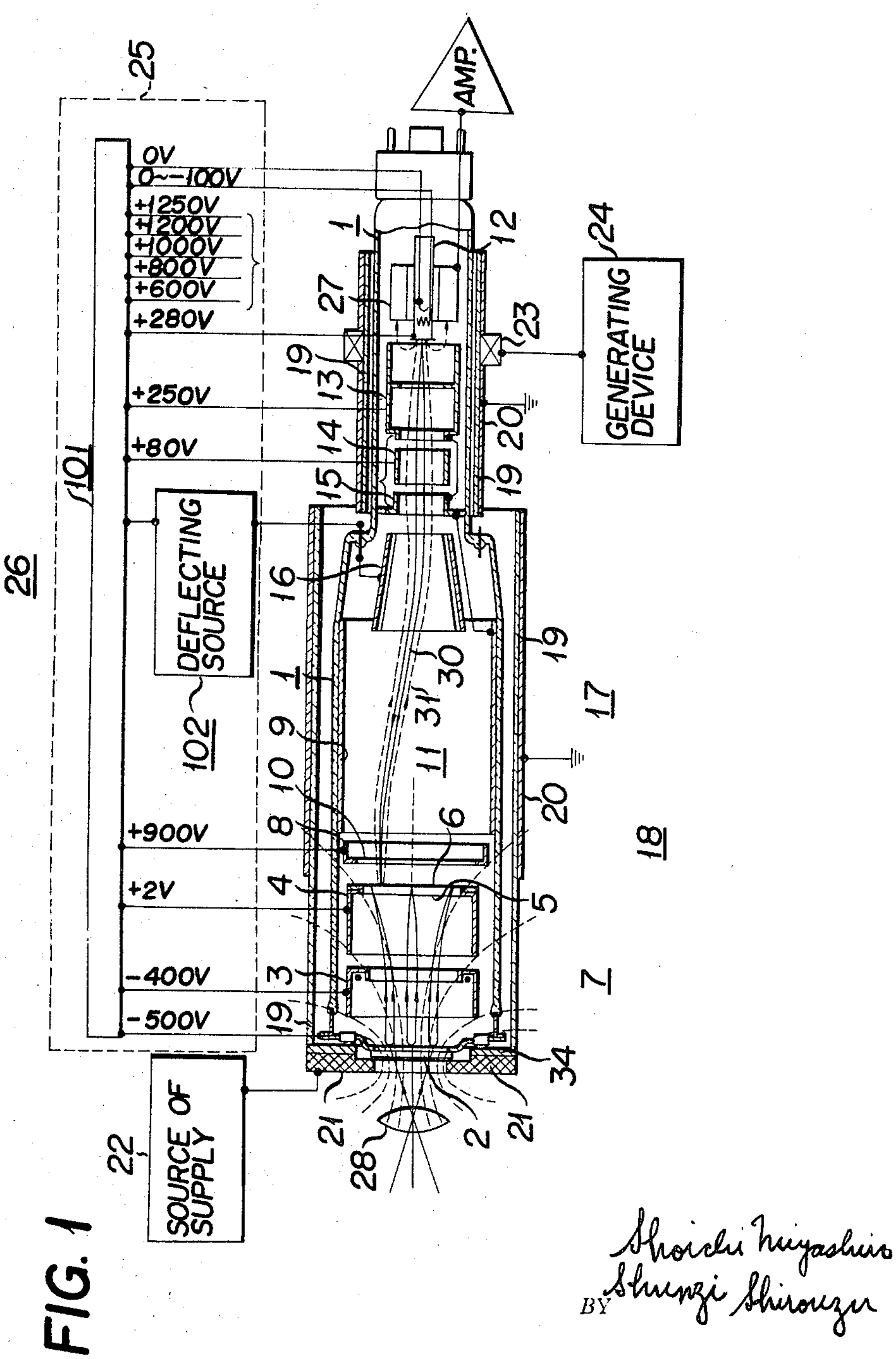
FIG. 1 is a diagram illustrating an example of application of the television pickup device according to this invention to an image orthicon type pickup tube.

Now the television image pickup tube device according to this invention as it is applied to an image orthicon tube will be described with reference to FIG. 1.

On the internal surface of the face plate on one edge of a vacuum container 1 is provided a photoelectric cathode 2, with which coaxially provided are a first cylindrical electrode 3 and a target electrode 4. At the end of the electrode 4 is mounted a disc-shaped target mesh electrode 5 in parallel to said photoelectric cathode 3, and a disc target 6 is provided closely in parallel to the said mesh electrode 5 to form an image section 7. Coaxially with the said target 6 are provided a second cylindrical electrode 8 and a third electrode 9. At the end on said target 6 side of said second electrode 8 is mounted a field mesh electrode 10. Said mesh 10, the second electrode 8, and the third electrode 9 form a collimation lens 11.

On the other end of the said vacuum container 1 is provided an electron gun 12, with which are coaxially mounted a fourth cylindrical electrode 13, a focussing electrode 14 and a fifth electrode 15. Between said electrode 15 and said third electrode 9, a deflecting plate 16 is provided for deflecting the electron beam vertically and horizontally, in such a way that the center of deflection of said deflecting plate 16 matches the focus of said collimation lens 11. And a secondary electron multiplier section 27 is provided around said electron gun 12 to form the scanning section 17. Said scanning section 17 and the image section 7 make up the image orthicon 18. The air surrounding said orthicon 18 is covered with the enclosure 19, whose scanning section 17 is made of the magnetic shield case 20. Further, at a desired position where the magnetic field of the aforementioned target 6 and the scanning section 17 becomes under 25 gauss in the neighborhood of said photoelectric cathode 2 of the said enclosure 19, the magnetic field generating device such as the solenoid coil 21 and a magnet 34 is mounted, for which coil is provided a power supply 22. Furthermore, in front of the incident light side of said photoelectron cathode 2 is provided the optical lens 28. Around the vacuum tube 1 in the neighborhood of said electron gun 12 is provided the alignment coil 23, for which a power supply 24 is provided. Furthermore, an electric power supply 25 is provided for supplying the operation voltage respectively for each electrode of said image orthicon 18 to form the image pickup tube device 26.

Now, the principles of operation of this device are explained with reference to FIG. 1, as follows:

The operating voltages are supplied to the following parts at the following levels: −500 v. to the photoelectron cathode 2 of the image orthicon 18, −400 v. to the first electrode 3, 2 v. to the target electrode 4, 0 v. to the cathode of the electron gun 12, 250 v. to the fourth electrode 13, about 80 v. to the focussing electrode 14, 900 v. to the field mesh electrode 10, and 1,250 v. to the anode of the secondary electron multiplier section 27. After this supply of the voltages, an optical image is formed at the photoelectron cathode 2 by means of the optical lens 28, which in turn generates the image electron beam from said cathode 2. Said electron beam is electromagnetically focussed by the axially symmetrical magnetic field caused by the solenoid soil 21 and the magnet 34 provided outside the vacuum container 1 and by the electrical field formed by the first electrode 3 and the traget electrode 4, and is accelerated and projected as the image on the surface of the target 6. In this manner, the positive charge image is stored on the said target 6.

On the other hand, the primary electron beam 30 projected from the electron gun 12 is focussed by the focussing electrode 14, and then is deflected vertically and horizontally by the deflecting plate 16. Then the primary electron beam 30 is vertically incided into the target 6 by the collimation lens 11 formed by the third electrode 9, the second electrode 8 and the field mesh electrode 10 and the axially symmetrical magnetic field formed by the said solenoid coil 21. At this time, the voltage of the field mesh 10 of the collimation lens 11 is highest to the primary electron beam 30, and the voltage provided to the target is 2 v. For this reason, a sharply decelerating electric field is formed from the field mesh electrode 10 to the traget 6. Consequently, the primary electron beam 30 scans at a low speed on the surface of the target 6. At this time, the positive charge image stored on the target is canned and discharged efficiently by the said primary electron beam and generates the reversing beam corresponding to the positive charge image. The returned electron beam 31 passes the deflecting plate 16 and the focussing electrode 14 and is led to the secondary electron multiplier section 27 where it is multiplied to the desired value and is taken out as the output signal.

In the application example described above, the well-known alignment coil 23 is provided around the tube 19 neighboring to the electron gun 12 in order to adjust the departing angle of the primary electron beam 30 and to assure the vertical landing upon the entire surface of the target 6, but a permanent magnet may be provided around the tube. Furthermore, it is advisable to make the magnetic shield case 20 of a metal having a high magnetic permeability for converting the scanning section and the electron gun in order to prevent distortions by external electrostatic and magnetic interferences.

Furthermore, it has been anticipated from the outset that the application of the magnetic field formed by the solenoid coil to the image section 7 would result in the leakage of the magnetic field applied to the image section 7 into the scanning section, causing such a bad effect as the corner shading. For this reason, a magnetic field generating device has been devised and provided in the neighborhood of the photoelectron cathode 2, and the tube having a longer image section 7 is made to conduct the experiment under the circumstances in which hardly any magnetic field would reach from the target 6 to the scanning section 17.

Nevertheless, this system was found to have the following shortcomings in parctical application compared with the conventional electromagnetic type image orthicon tube as described in the following.

Namely the conventional electromagnetic image orthicon can easily adjust the alignment of the primary electron beam by adjusting the current of the alignment coil by paying attention to the movement of the image of the hole of the first diode of the secondary electron multiplier section.

However, the construction in which the magnetic field in the neighborhood of the target is minimized by providing a longer image section as described above will hardly produce the image of the hole of the diode on the screen. This phenomenon was the disadvantage experienced also in the study of the all electrostatic image orthicon.

As a result of the study in view of this means, we found that if we allow the magnetic field to influence on the scanning side of the target, the image of the diode hole will immediately be reproduced.

This phenomenon seems to be due to the fact that the scattering is prevented by the magnetic field formed in the target and the scanning section by the solenoid coil immediately after the returned electron beam started off the target, and thus it is easily focused as a small spot on the diode. Thus the leakage of the magnetic field into the scanning section has been found to be desirable. Nevertheless, if the leakage of the magnetic field is allowed unduely, it would harm the vertical incision of the primary electron beam into the target.

Since the magnetic field leaked into the scanning section has a vector in the radial direction of the pickup tube, the primary electron beam that should have incided into the target if there were not the magnetic field will be turned from the desired direction already on the electron gun side of the field mesh electrode. Furthermore, it would turn further away from the desired direction when it slows down immediately before the target after passing the field mesh electrode.

However, by means of the collimation lens system utilizing the field mesh electrode which features this invention, a relatively high voltage may be supplied to the field mesh without giving bad influences over the deflection sensitivity, etc. For this reason, the speed of the primary electron beam in the neighborhood of the field mesh electrode can be increased to prevent the bending of the primary electron beam by the leaked magnetic field as described in the foregoing. However, if the leaked magnetic field becomes stronger than a certain level, the phenomenon of the primary electron beam as described above cannot be neglected. And when the vertical incision of the primary electron beam is hurt, its effect will be marked in the peripheral parts of the target, and cause pincushion distortion in the reproduced image.

Furthermore, when the leaked magnetc field gets stronger, the vertical incision will be further hurt, and the low speed scanning in the neighborhood of the target will cause further corner shading.

As a result of the experiment by means of various ring permanent magnets and electromagnetic coils for determining this relationship, it has been found out that the above-mentioned shortcomings become greater when there is a magnetic field of more than 25 gauss in the center of the target of a size conceivable as an ordinary pickup tube.

Furthermore, in the device by this invention, the field mesh 10 is provided which is maintained at a high potential close to the scanning side 17 of the target 6. For this reason, the primary electron beam is accelerated by a considerably high voltage up to the point immediately before the target 6, eliminating the bad effects due to the leaked magnetic field described in the above.

Nevertheless, it is not feasible to combine the low speed scanning by means of the conventional electrostatic method other than the method of this invention, for example, the low speed scanning method by providing the field mesh electrode and the target immediately after deflecting twice by providing two sets of deflecting plates in series to which the deflection voltage is applied in the reverse polarity to the scanning side, with the electromagnetic image section, because of the following reasons.

Namely if the voltage of the field mesh electrode provided immediately before the target is increased, the primary electron beam passing through the deflecting section will be accelerated, requiring a high deflection voltage which makes it infeasible.

On the other hand, in the scanning section 17 of this invention, the electron energy passing the deflecting system 16 can be made sufficiently low in comparison with the voltage of the field mesh electrode 10 to keep the deflection sensitivity unaffected, because the third electrode 9 is provided between the field mesh electrode 10 and the deflection system 16, forming the collimation lens with said field mesh electrode 10.

Now an example of application of this construction is explained with reference to FIG. 1 as follows. When the distance from the photoelectron cathode 2 to the target is made 60 mm., the diameters of the first electrode 3 and the target electrode 4 respectively about 60 mm., and the operational diameter of the target 6 is made 48 mm., and a current is flown by providing the doughnut coil 21 in front of the optical lens 28 of the photoelectron cathode 2, to generate a magnetic field at 90 gauss in the neighborhood of the photoelectron cathode 2 and at 10 gauss in the neighborhood of the target 6, a good focussing and a good quality of picture can be gained by making the acceleration of the photoelectrons at 500 v. The magnification rate of the electron lens of the image section 7 was 28 at this time.

Nevertheless, even in the device of this invention, if the current of the coil is kept on the increase, a pincushion distortion will be caused gradually in the reproduced image, and then corner shading will be caused to make the system impractical.

Furthermore, for applying such a magnetic field to the image section, the solenoid coil or a ring or cylindrical permanent magnet, or their combination as shown in FIGS. 1 and 4 can be utilized.

Figures 2A, 2B, 3A, 3B:
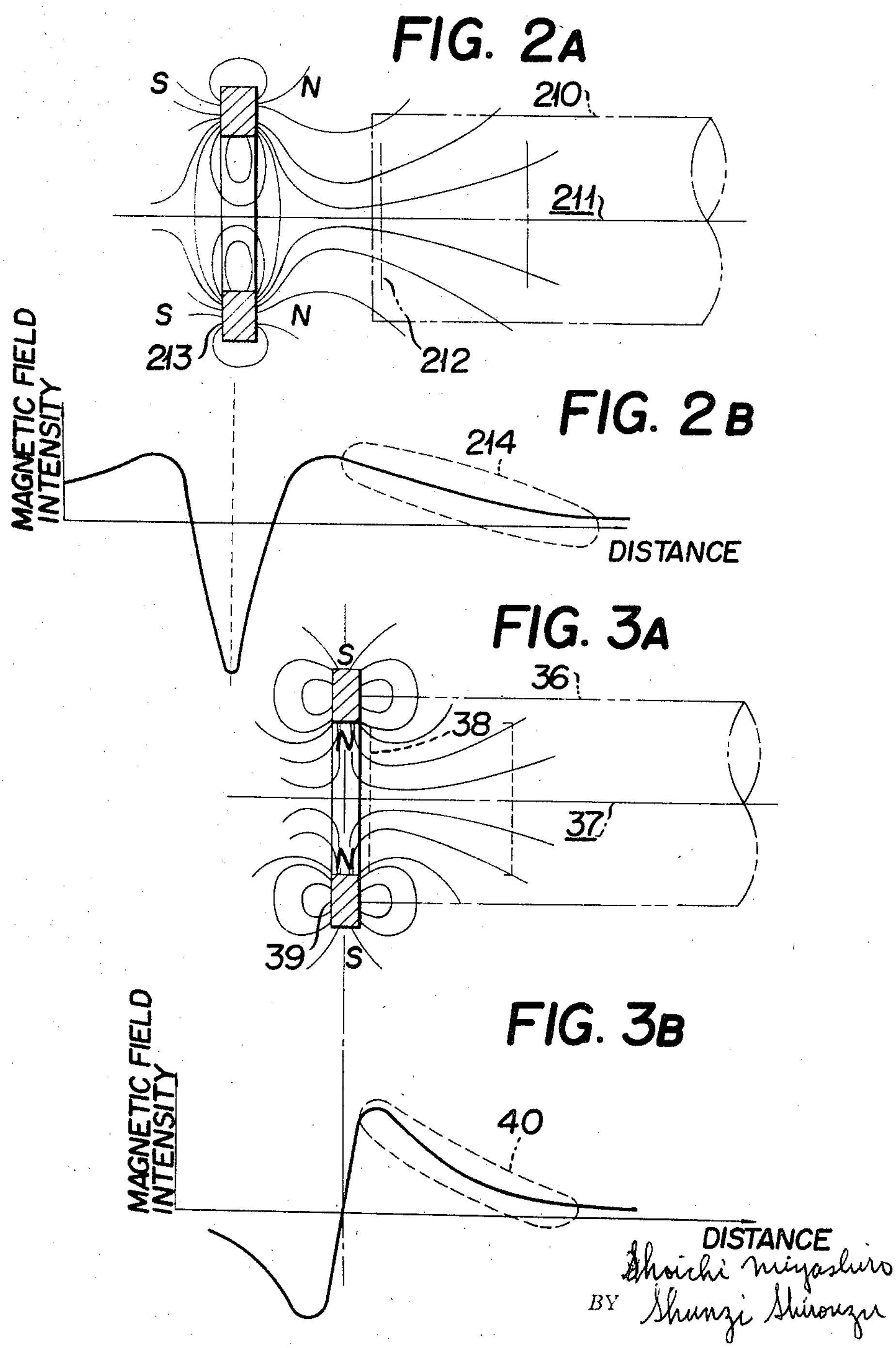
FIGS. 2A, 3A and 4A are diagrams illustrating other applications of the magnetic field device for forming the magnetic field distribution of the television image pickup device by this invention.
FIGS. 2B, 3B and 4B are diagrams which qualitatively illustrate the magnetic field distribution on the central shaft of the magnetic field device of FIGS. 2A, 3A and 4A.

As for the permanent magnet to be used, a ferrite or alnico (Al-Ni-Co alloy) magnet is a doughnut shape having a polarity on both sides of the doughnut as shown in FIG. 2A is conceivable.

Namely FIGS. 2A and 2B indicate the configuration when a permanent magnet 213 having a pole on both sides is provided in front of the image section 211 of the image orthicon 210 and the photoelectron cathode 212.

And the magnetic distribution of said permanent magnet 213 at the axis forms the valley of the strength of the magnetic field on the permanent magnet 213 as shown in FIG. 2B, forming an attenuation curve as it gets farther from the said magnet 213. Consequently the correlation between this permanent magnet 213 and the said image orthicon 210 can gain the desired effect as described in the above by providing the image section 211 of the image orthicon in the range shown by the dotted line 214 in the attenuation curve in FIG. 2B. Further, as an example of application utilizing other magnets, the case in which a ring permanent magnet having a pole respectively in the internal and in the external periphery of the ring magnet as shown in FIG. 3A is explained below.

FIGS. 3A and B indicate the correlation when said ring permanent magnet 39 is provided in front of the image section 37 of the image orthicon 36 and the photoelectron cathode 38.

The axial magnetic field distribution of said permanent magnet 39, as shown in FIG. 3B, has a reversed magnetic field intensity on sad magnet 39, forming an attenuation curve as it gets farther from said magnet 39. Consequently, the interrelation between this permanent magnet 39 and said image orthicon 36 can obtain the desired effect described above by providing the image section 37 of the image orthicon 36 in the attenuation curve part, in the range shown by the dotted line 40 in the FIG. 3B.

Figures 4A, 4B:
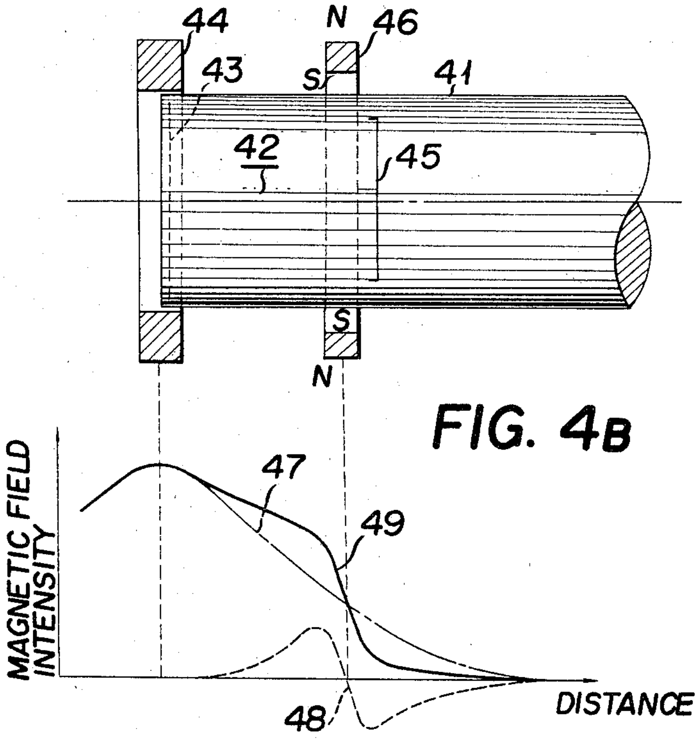

Furthermore, as an example of application utilizing another type of magnet, the case in which the desired effect of the leaked magnetic field is obtained on the scanning side by forming a relatively strong magnetic field in the neighborhood of the target on the image side as shown in FIG. 4A is explained below.

FIGS. 4A and B illustrate the interrelation when the magnetic field generator 44 is provided on the photoelectron cathode 43 of the image section 42 of the image orthicon 41, and the ring magnet 46 having a relatively weak magnetic field as applied in FIG. 3 is provided in the neighborhood of the target 45 of the image section 42.

The magnetic field distribution on the axis of the said magnetic field generator 44 is a chain line 47 as shown in FIG. 4B, and the magnetic field distribution on the axis of the ring magnet 46 is shown by dotted line 48, giving the overall magnetic field the characteristics illustrated by a real line 49 to influence the respective photoelectrons.

Consequently this construction has the advantage of the capacity to control the leaked magnetic field to the target 45 and the scanning section to the desired value by providing the magnet 46 in the neighborhood of target 45.

It is of course possible to combine in various ways these magnets and to adjust the excitation of the electromagnetic coil for enabling the electron zooming, that is, variation in the magnification rate of the electron lens by varying the form of the magnetic field. Although it is possible to conduct the electron zooming also in the electrostatic image section, it can be conducted preferably in the electromagnetic image section for maintaining the good quality of the picture.

Furthermore, it is to be noted that although in the application examples described above the invention is applied for the image orthicon formed by the electromagnetic forcussing image section, the electrostatic deflection, and the electrostatic focussing scanning section, it is hardly necessary to point out that any scanning section can obtain the same effects as in the application examples described in the above if it is constructed in such a way that it deflects the primary electron beam from the electron gun after it has focussed whether it is by the electromagnetic focussing electromagnetic deflection or electrostatic focussing and electromagnetic deflection.

Needless to say, any target that has the desired performance whether it is a target showing the conventional EBIC (electron bombard induced conduction) effect or SEC (secondary electron conduction) effect by electron impact can be used for the target of this system.

Furthermore, although in the examples explained in this patent application description a case in which the reversing beam is utilized in the scanning section has been explaned, it is hardly necessary to point out that the appliction to a pickup tube which takes out the signal directly from the electrode on the back of the target can also obtain the same effect as the example given in the above.

While various embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed is:

1. A television image pickup device, comprising an electron scanning section including a vacuum container defining a longitudinal axis, an electron gun mounted for emitting an electron beam along said axis focussing means for focussing the electron beam from said electron gun, electro-static means for electrostatically deflecting the focussed electron beam, cylindrical electrodes mounted coaxially with said electron gun, a field mesh electrode for supplying the highest electrical potential to said electron beam for making said electron beam parallel to said axis, a collimation lens mounted coaxially with said electrodes and formed by the electrostatic field of said field mesh electrode, and a target mounted in close parallel to said field mesh electrode and scanned at a low speed by said electron beam, an image section including a photoelectron cathode mounted at the other end of said vacuum container and a magnetic field generator provided outside the container on said image section side for focussing the image electrons from said cathode on said target, which produces a leakage of a maximum of 25 gauss of magnetic field on the axis of the container on said target.

2. The television image pickup tube according to claim 1 wherein said magnetic field generator is an annular electromagnet.

3. The television image pickup tube according to claim 1 wherein said magnetic field generator is a tubular electromagnet.

4. The television image pickup tube according to claim 1 wherein said magnetic field generator is an annular permanent magnet.

5. The television image pickup tube according to claim 1 wherein said magnetic field generator is a tubular permanent magnet.

6. The television image pickup tube according to claim 1 wherein said magnetic field generator is formed of a combination of a tubular electromagnet and a tubular permanent magnet.

References Cited

UNITED STATES PATENTS

| | | | |
|---|---|---|---|
| 2,565,533 | 8/1951 | Szegho et al. | 313—79 |
| 2,627,043 | 1/1953 | O'Callaghan | 313—79 X |
| 2,673,305 | 3/1954 | Szegho | 313—79 X |
| 2,723,360 | 11/1955 | Rotow | 313—79 X |
| 2,792,514 | 5/1957 | Rotow et al. | 313—79 X |

RODNEY D. BENNETT, Jr., *Primary Examiner.*

J. P. MORRIS, *Assistant Examiner.*

U.S. Cl. X.R.

313—79